United States Patent
Lutaud et al.

(10) Patent No.: US 7,265,537 B2
(45) Date of Patent: Sep. 4, 2007

(54) ANNULAR SENSOR HOUSING

(75) Inventors: Dominique Lutaud, Orbigny au Mont (FR); Eric Kammerer, Langres (FR)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 11/236,750

(22) Filed: Sep. 27, 2005

(65) Prior Publication Data

US 2006/0022665 A1 Feb. 2, 2006

Related U.S. Application Data

(62) Division of application No. 10/350,683, filed on Jan. 24, 2003.

(51) Int. Cl.
*G01R 33/06* (2006.01)
*G01P 3/487* (2006.01)

(52) U.S. Cl. .................... 324/174; 324/207.25

(58) Field of Classification Search .................
324/207.12–207.17, 207.2, 207.21, 207.23–207.25,
324/166, 173–174; 384/448
See application file for complete search history.

(56) References Cited

U.S. PATENT DOCUMENTS

| | | |
|---|---|---|
| 3,275,332 A | 9/1966 | May |
| 3,875,654 A | 4/1975 | Ushijima |
| 4,526,383 A | 7/1985 | Fuchs et al. |
| 5,223,760 A * | 6/1993 | Peck et al. .................. 310/168 |
| 5,264,790 A * | 11/1993 | Moretti et al. .............. 324/174 |
| 5,388,916 A | 2/1995 | Ohtsuki et al. |
| 5,570,013 A | 10/1996 | Polinsky et al. |
| 5,574,361 A * | 11/1996 | Seefeldt et al. ............. 324/174 |
| 5,873,658 A | 2/1999 | Message et al. |
| 6,386,764 B1 | 5/2002 | Moore et al. |
| 6,796,713 B2 * | 9/2004 | Landrieve .................... 384/448 |
| 6,952,068 B2 * | 10/2005 | Gieras et al. ............... 310/254 |

FOREIGN PATENT DOCUMENTS

| | | |
|---|---|---|
| DE | 3309538 | 9/1984 |
| DE | 4120023 | 8/1992 |
| DE | 68911238 | 4/1994 |
| DE | 19740348 | 3/1999 |
| DE | 20000694 | 4/2000 |
| DE | 19922215 | 11/2000 |
| EP | 0495323 | 7/1992 |
| EP | 0487405 B1 | 8/1995 |
| EP | 0669534 | 8/1995 |
| WO | WO0067038 | 11/2000 |

* cited by examiner

*Primary Examiner*—Reena Aurora
(74) *Attorney, Agent, or Firm*—Harness, Dickey & Pierce, P.L.C.

(57) ABSTRACT

A sensor device for a shaft of a machine having a machine housing, the shaft having a shaft circumference and the machine housing having a sealed receiving bore. The sensor device includes a sensor for measuring motion parameters of the shaft and a stationary annular sensor housing that supports the sensor and encircles the shaft about the shaft circumference in a centered manner and at a distance. The sensor housing is retained in the receiving bore by a press fit or screw connection.

10 Claims, 12 Drawing Sheets

ANNULAR SENSOR HOUSING

CROSS-REFERENCE TO RELATED APPLICATIONS

This application is a divisional of U.S. patent application Ser. No. 10/350,683, filed on Jan. 24, 2003 (now U.S. Publication No. 2004/0145365A1). This application relates to German Patent Application No. 10149642.7-52, filed Oct. 9, 2001. The disclosures of the above applications are incorporated herein by reference in their entirety.

BACKGROUND OF THE INVENTION

The present invention relates to an annular sensor housing for tracking the motion of a rotatable shaft.

Housings for receiving sensors which can be used to track the rotation of shafts are known per se.

A sealing flange for sealing rotating machine parts is known from German Utility Model Patent No. DE-U-200 00 694. This sealing flange features a sensor which is secured using spring elements.

German Patent Application No. DE-A-199 22 215 describes a device which allows a sensor to be aligned in a housing.

European Patent Application No. EP-A-495,323 describes an annular fastening for a sensor.

A shaft sealing ring including a sensor is known from German Patent Application No. DE-A-1 97 40 348. In this context, it is a disadvantage that the positioning of the angle of the ring can be carried out only inaccurately. The figures indeed depict a sensor; however, no information on the type and positioning of a sensor housing is found in this document.

World Patent Application No. WO-A-00/67,038, European Patent Application No. EP-A-669,534, and U.S. Pat. No. 5,873,658 describe rolling-contact bearings which are provided with annular sensor housings. In the known designs, the sensor housings cannot be used to seal bores in machine parts, that is, they do not encircle the shaft on its circumference in a centered manner.

German Patent No. DE-C-41 20 023 describes a direct-current motor which features a sensor device outside the motor housing. This document does not disclose any annular sensor housing to be inserted in bores of machine parts either.

SUMMARY OF THE INVENTION

Starting from this prior art, an object of the present invention is to provide a sensor housing which is inexpensive to manufacture, which can be installed without complex alignment procedures, has a small installation space requirement, and ensures a rigid support of the sensor. This, in turn, results in a high signal quality since the housing according to the present invention does not permit any misalignment with respect to the shaft, as a result of which a misalignment of the sensor can easily be avoided.

The sensor housing according to the present invention has a rugged design, which is why it has a long service life.

This objective may be achieved by a housing (3) around a shaft (1) which housing is stationary and contains at least one sensor (4) for measuring motion parameters of shaft (1), such as the speed of rotation and/or the angle of rotation and/or the running smoothness. The housing has an annular shape and encircles shaft (1) on its circumference in a centered manner and at a distance; i.e., there is no direct contact between shaft (1) and the central opening in housing (3).

In one embodiment of the present invention, sensor housing (3) is fixed in a receiving and sealed bore of a machine housing; preferably, sensor housing (3) is retained in a receiving and sealed bore of a machine housing by a press fit or screw connection. Particularly preferably, sensor housing (3) has seals for sealing the bore and, in particular, is additionally designed as an adhesion part (10) for a shaft sealing ring (5) which provides the dynamic sealing of shaft (1).

In a further embodiment of the present invention, provision is made for an adhesion part (10), a shaft sealing ring (5) for dynamic sealing and a static seal (1) for the bore, and sensor housing (3), together with adhesion part (10) for shaft sealing ring (5), is attached to the receiving bore of a machine housing.

Generally, there are lubricants inside the machine housing. There, it is required to seal the passage of shaft (1) through the machine housing. In this further embodiment, annular sensor housing (3) is usually located on the air side of the bore; therefore, it does not come in contact with the lubricants inside and can generally be easily replaced as needed without eliminating the sealing effect.

Possible machine housings include all housings that have sealed bores for the passage of shafts. Examples of these include crankshaft housings, transmission housings, differential gears, or housings of planetary drive axles.

Possible sensors include any elements which can be used to monitor the speed of rotation and/or the angle of rotation and/or the running smoothness of a shaft. Examples include magnetic or optical sensors that cooperate with a position encoder mounted on the shaft.

In a preferred embodiment of the sensor housing, sensor (4) is molded into or clamped in sensor housing (3) or held by other fastening means. It is very particularly preferred for sensor (4) to be radially removable from sensor housing (3).

In a preferred embodiment, an encoder wheel (7) is nonrotatably connected to shaft (1), the encoder wheel, together with sensor (4), allowing measurement of the rotary motion and/or of the angle of rotation of the encoder wheel and, consequently, of the shaft.

In a preferred embodiment, sensor housing (3) and adhesion part (10) are made of plastic and, in particular, are integrally formed of the same material.

Sensor housing (3) is preferably designed such that a narrow gap is formed between encoder wheel (7) and sensor housing (3), and that at least one sensor (4) is located in sensor housing (3).

Usually, sensor housing (3) has a centering diameter (8) which is greater or smaller than the diameter of encoder wheel (7). In this context, centering diameter (8) is understood as the diameter that abuts the sealed bore or a cylindrical surface of the shaft sealing ring.

In another preferred embodiment, annular adhesion part (10) for shaft sealing ring (5) contains a reinforcing ring (6) which is preferably composed of metal.

In this embodiment, adhesion part (10) is preferably adhesively bonded to annular sensor housing (3); adhesion part (10) and shaft sealing ring (5) being connected to each other by a polymeric intermediate layer.

In a further preferred embodiment, annular adhesion part (10) for shaft sealing ring (5) is retained by a press fit in bore (2) which constitutes the opening for the passage of shaft (1) from inside to outside of the machine.

In another preferred embodiment, annular adhesion part (10) for shaft sealing ring (5) is composed of polymeric material and a tough reinforcement (6) and is clamped between sensor housing (3) and the machine part wall.

In a further preferred embodiment, sensor housing (3) according to the present invention has an external thread (15) which is used for screwing into the internal thread of a bore. Very particularly preferably, at least one sensor (4) is located near the inner surface of sensor housing (3), and shaft (1) itself is provided with devices which allow sensor (4) to generate a measured quantity.

In a further preferred embodiment, annular adhesion part (10) for shaft sealing ring (5) is connected (clipped) to sensor housing (3) in a positive-locking manner and is preferably composed of plastic. In this embodiment, sensor housing (3) can initially be clipped to adhesion part (10) and, subsequently, this combination is inserted into the bore to be sealed.

In one preferred embodiment of sensor housing (3) according to the present invention, the sensor housing contains at least one sensor (4) near its inner diameter; the sensor, together with the exit of cable (9), being arranged in a radial projection (19) facing outward.

In another preferred embodiment of sensor housing (3) according to the present invention, the sensor housing contains a plurality of sensors (4) which are each arranged at an inward-facing radial projection (17) of sensor housing (3).

Also preferred is a sensor housing (3) in which a device for determining the angular position of the housing is provided, preferably a groove (16) for a feather key and/or at least one outward-facing radial projection (19) which determines the angular position of the housing.

In another preferred embodiment, the sensor housing according to the present invention is composed of an outer ring (23) and an inner ring (22); at least one sensor (4) including a measuring pickup (20) and a measuring transducer (21) being inserted between the separately produced rings (22, 23), and shaft (1) being supported by the central bore of inner ring (22).

A further preferred embodiment relates to a sensor housing (3) which, just as encoder wheel (7), is provided with a hole which is used for angular positioning and with which can engage a parallel pin (18) of a mounting tool.

Very particularly preferably, shaft (1) also has a hole which is used for angular positioning and with which engages a further parallel pin (18) of a mounting tool (24).

The sensor housing according to the present invention can generally be installed in machines or machine parts having bores for the passage of shafts. The sensor housing is preferably used for the passage of camshafts, crankshafts or transmission shafts through bores in machine housings.

The present invention also relates to the uses in combination with these shafts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
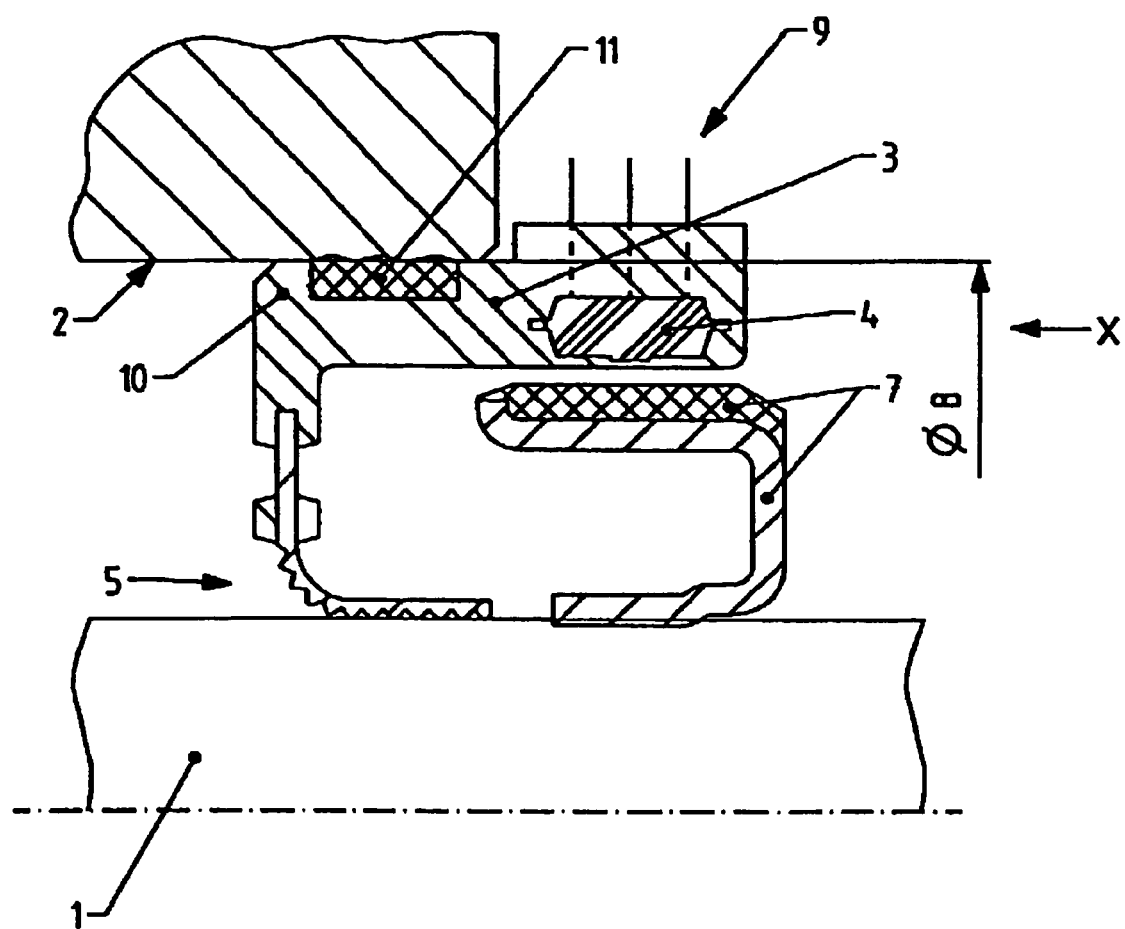
FIG. 1 is a longitudinal section through an annular sensor housing.

FIG. 1 shows an embodiment of the sensor device according to the present invention in a longitudinal cross-section. An encoder wheel 7 is nonrotatably connected to shaft 1. Shaft 1 is passed through a central bore of annular sensor housing 3 to the outside. Sensor housing 3 has an adhesion part 10 of a shaft sealing ring 5 which provides the dynamic sealing of shaft 1 and the static sealing of a receiving bore 2. Adhesion part 10 of shaft sealing ring 5 is preferably formed of plastic, for example, of a thermoplastic or thermosetting plastic. In the embodiment shown, adhesion part 10 and sensor housing 3 are integrally formed of the same material. Sensor housing 3 is designed such that a narrow gap is formed between encoder wheel 7 and the sensor housing 3. Located in sensor housing 3 is at least one sensor 4 which is connected to an evaluation unit (not shown) by which the signals that are carried away via a cable 9, which leads radially away, are processed into information on the speed of rotation or the angle of rotation and/or the running smoothness of shaft 1. Sensor housing 3 is retained in receiving bore 2 by a press fit. Static seal 11 seals sensor housing 3 from the outside. In the embodiment shown, sensor housing 3 has a centering diameter 8 which is greater than the diameter of encoder wheel 7. Sensor housing 3 is centered in the bore for shaft 1; sensor 4 can be clamped in or molded into sensor housing 3 or held by other fastening means. Encoder wheel 7 can have an arbitrary design as long as it enables sensor 4 to pick up information on motion parameters of shaft 1. Thus, for example, encoder wheel 7 can have a uniform diameter along its circumference and be designed as a multi-pole wheel which is alternately magnetized into north poles and south poles, or encoder wheel 7 may feature alternately arranged segments of different diameter along its circumference.

Figure 2:
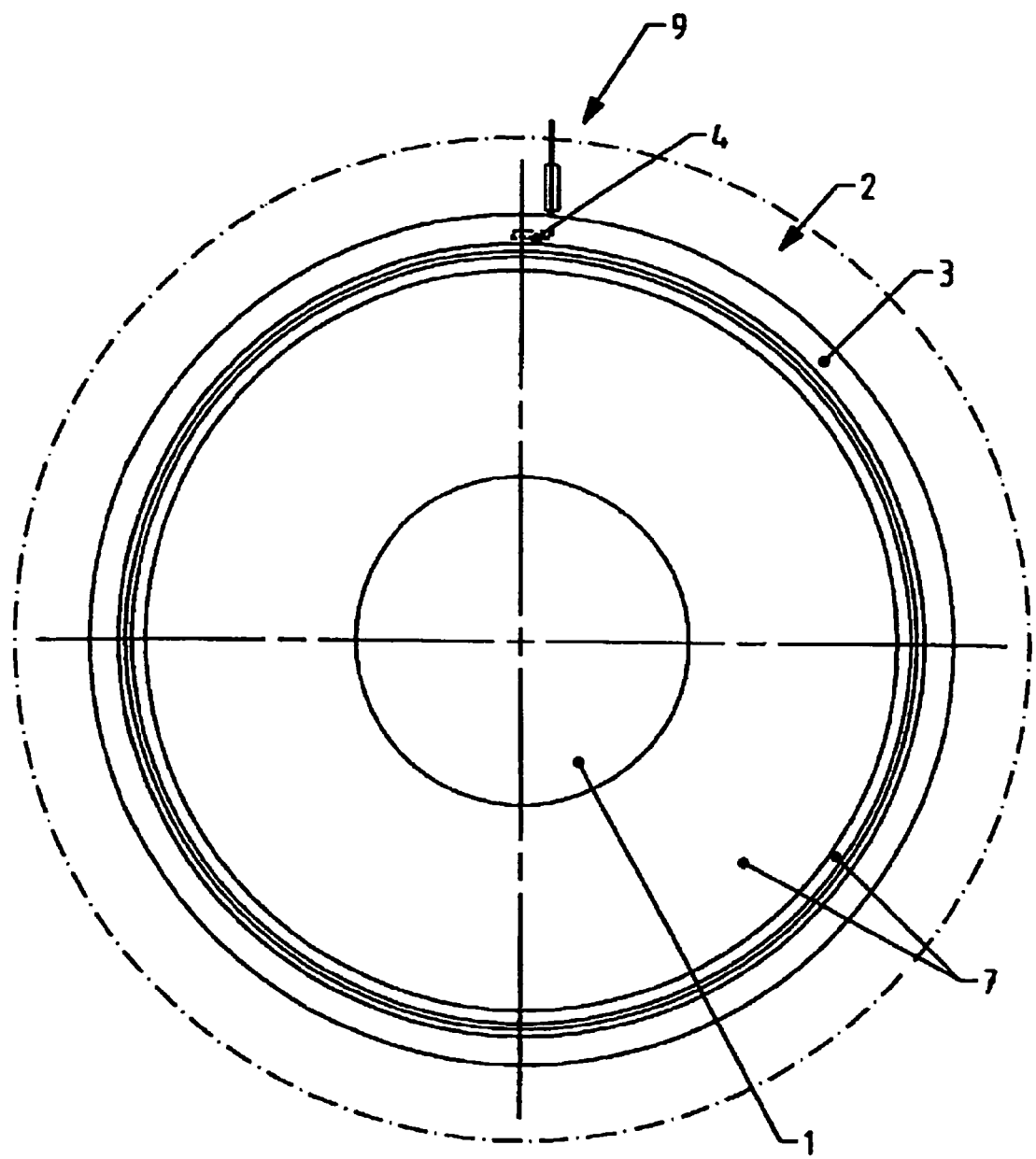
FIG. 2 is a view of the annular sensor housing of FIG. 1 from position X.

FIG. 2 is a view of the annular sensor housing 3 of FIG. 1 from position X. Discernible is the cross-section of shaft 1 and encoder wheel 7. The encoder wheel is encircled by annular sensor housing 3 into which is integrated the sensor 4, including cable 9 facing radially away. Preferably, the sensor housing 3 contains a plurality of sensors 4. Also discernible is bore 2 through which shaft 1 is guided to the outside.

Figure 3:
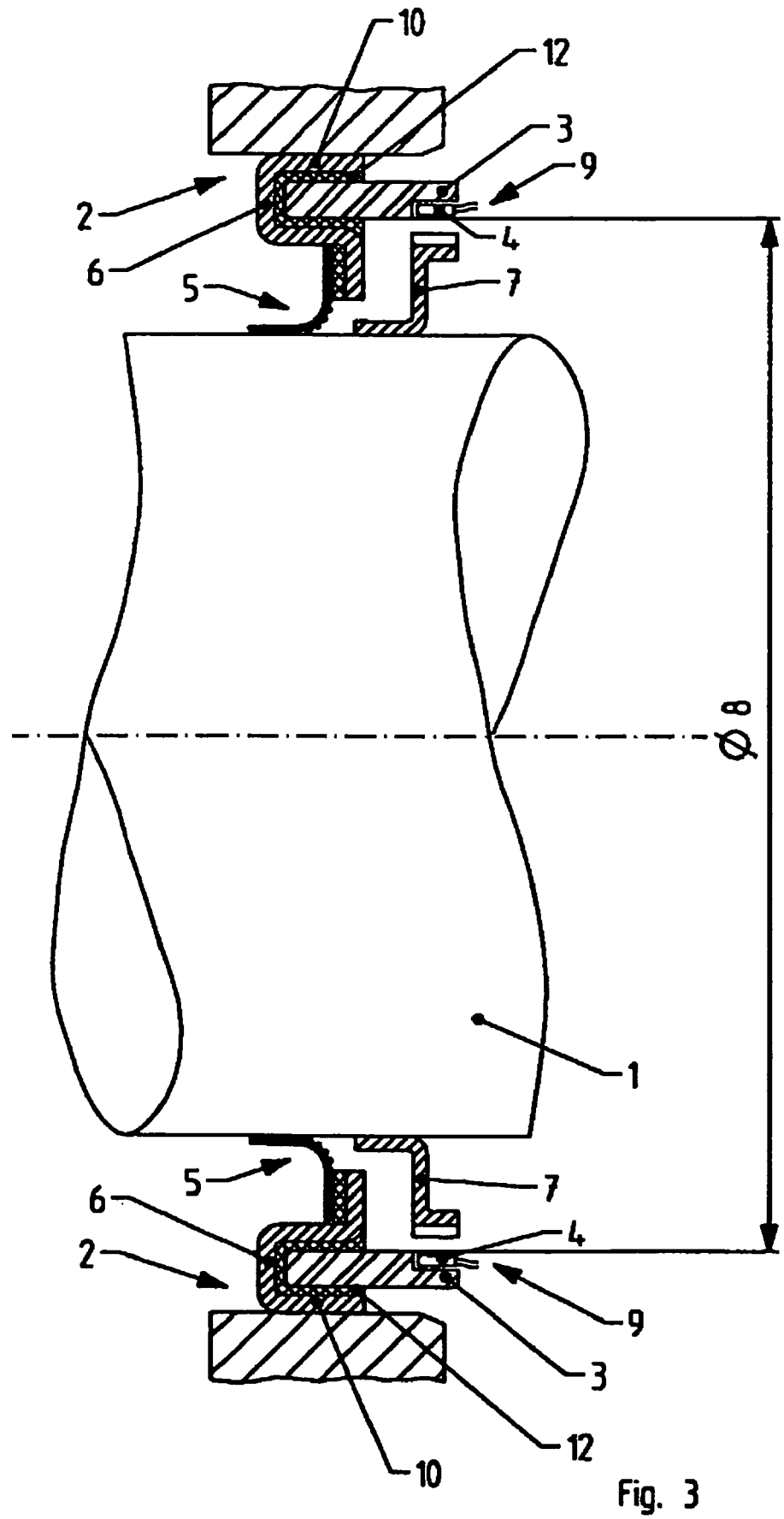
FIG. 3 depicts a longitudinal section through a further annular sensor housing.

FIG. 3 shows a further embodiment of the annular sensor housing according to the present invention in a longitudinal cross-section. An encoder wheel 7 is nonrotatably connected to shaft 1. Shaft 1 is passed through a central bore of annular sensor housing 3 to the outside. Adhesion part 10 for shaft sealing ring 5 includes a reinforcing ring 6 which is preferably composed of metal and provides the static sealing of the receiving bore. In this embodiment, adhesion part 10 is adhesively bonded 12 to annular sensor housing 3. In the embodiment shown, adhesion part 10 and shaft sealing ring 5 are connected to each other by an elastomeric intermediate layer. Sensor housing 3 is designed such that a narrow gap is formed between encoder wheel 7 and the sensor housing 3. Located in sensor housing 3 are a plurality of sensors 4 which are connected to an evaluation unit by which the signals that are carried away via cable(s) 9, which lead axially away, are processed into information on the speed of rotation or the angle of rotation of shaft 1. Adhesion part 10, together with sensor housing 3, is secured to bore 2 through which shaft 1 exits the unit. In the embodiment shown, sensor housing 3 has a centering diameter 8 which is greater than the diameter of encoder wheel 7. Sensor housing 3 is centered in the bore for shaft 1; sensors 4 can be molded into or clamped in sensor housing 3 or held by other fastening means.

Figure 4:
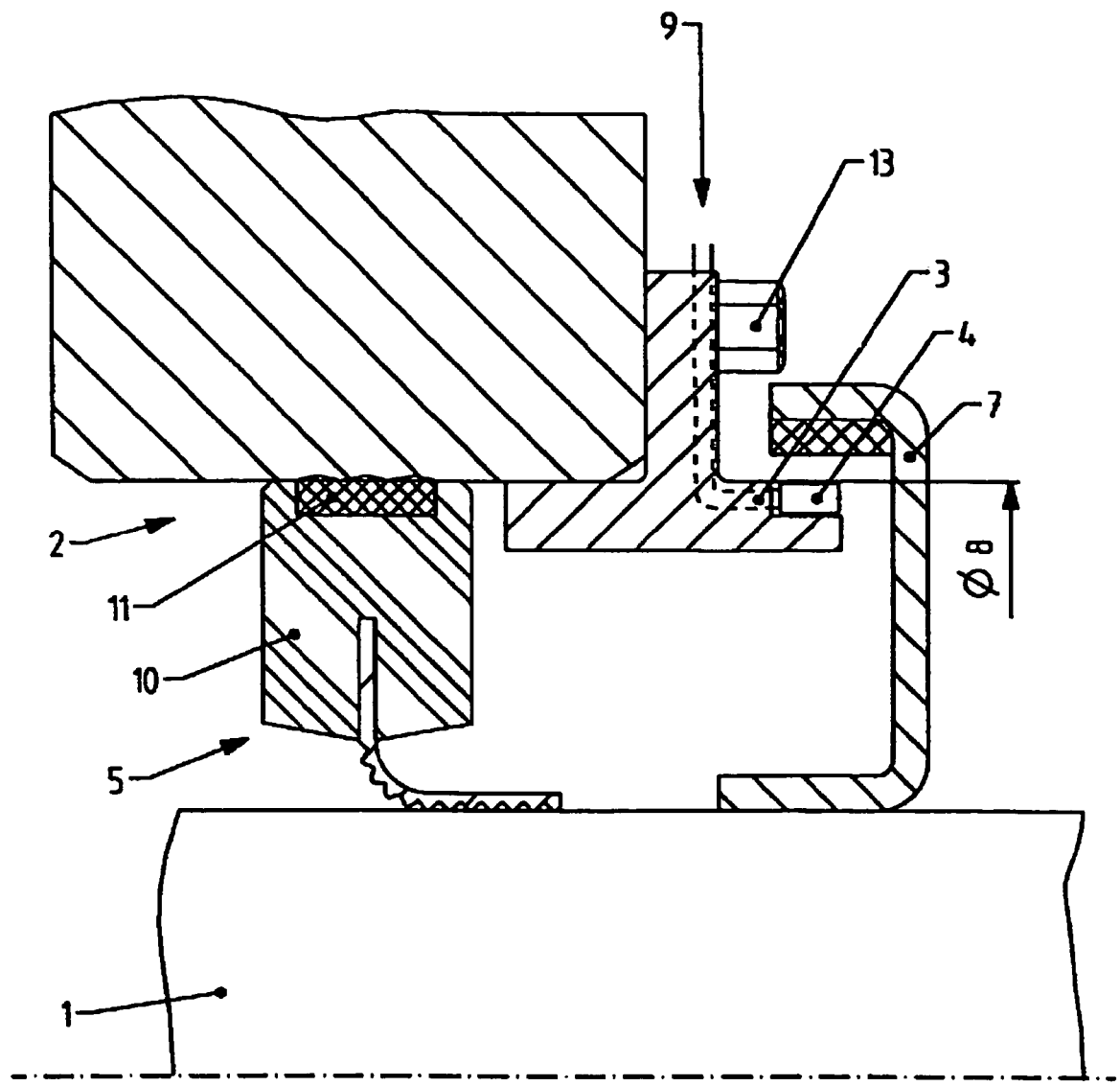
FIG. 4 depicts a longitudinal section through another annular sensor housing.

FIG. 4 shows a further embodiment of the annular sensor housing according to the present invention in a longitudinal cross-section. An encoder wheel 7 is nonrotatably connected to shaft 1. Shaft 1 is passed through a central bore of annular sensor housing 3 to the outside. Adhesion part 10 for shaft sealing ring 5 is retained in bore 2 by a press fit. Sensor housing 3 is screwed to the wall of the unit with screws 13. Adhesion part 10, just as sensor housing 3, is preferably composed of plastic. Static seal 11 seals adhesion part 10 from the outside. Sensor housing 3 is designed such that a narrow gap is formed between encoder wheel 7 and the sensor housing.

Located in sensor housing 3 is at least one sensor 4 which is connected to an evaluation unit. The signals picked up by sensor 4 are carried away via cables 9 which lead radially away. In this embodiment, the seals and their holders 5, 10, 11 as well as the sensor system 3, 4, 9 are two separate components. In the embodiment shown, sensor housing 3 has a centering diameter 8 which is smaller than the diameter of encoder wheel 7. Sensor housing 3 is centered in the bore for shaft 1; sensor 4 can be molded into or clamped in sensor housing 3 or held by other fastening means.

Figure 5:
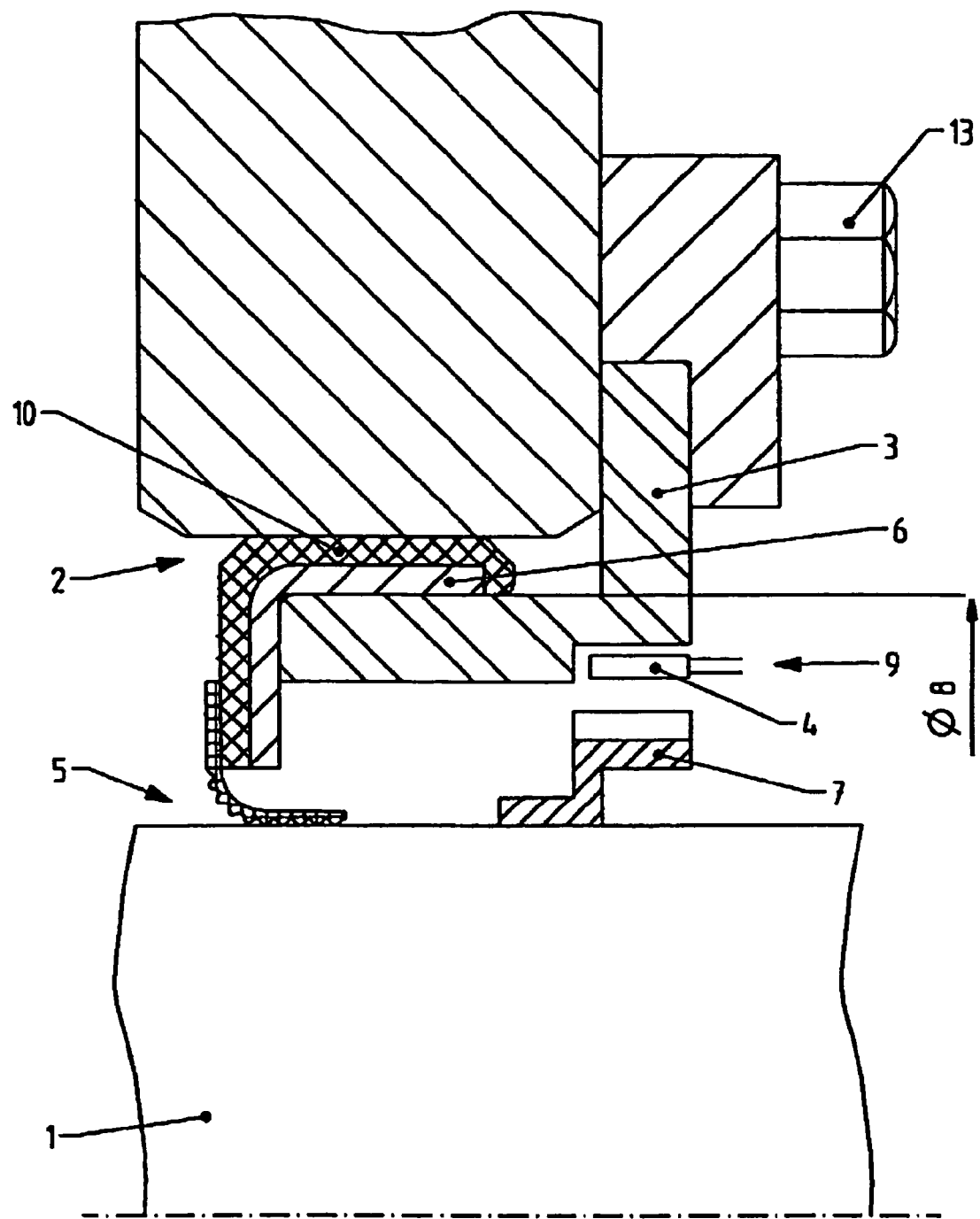
FIG. 5 is a longitudinal section through a further annular sensor housing.

FIG. 5 shows a further embodiment of the annular sensor housing according to the present invention in a longitudinal cross-section. An encoder wheel 7 is nonrotatably connected to shaft 1. Shaft 1 is passed through a central bore of annular sensor housing 3 to the outside. Adhesion part 10 for shaft sealing ring 5 is composed of elastomeric material with a tough, in particular metallic reinforcement 6 and is clamped between sensor housing 3 and the machine part wall. Sensor housing 3 is designed such that a narrow gap is formed between encoder wheel 7 and the sensor housing. Located in sensor housing 3 is at least one sensor 4 which is connected to an evaluation unit. The signals picked up by sensor 4 are carried away via cables 9 which lead axially away. Adhesion part 10 is retained by a press fit in bore 2 in the machine. In the embodiment shown, sensor housing 3 has a centering diameter 8 which is greater than the diameter of encoder wheel 7. Sensor housing 3 is centered in shaft sealing ring 5 in the bore for shaft 1. Sensor 4 can be embedded in sensor housing 3 or held by other fastening means. Sensor housing 3 is axially secured from movement by an angled ring and screws 13.

Figure 6:
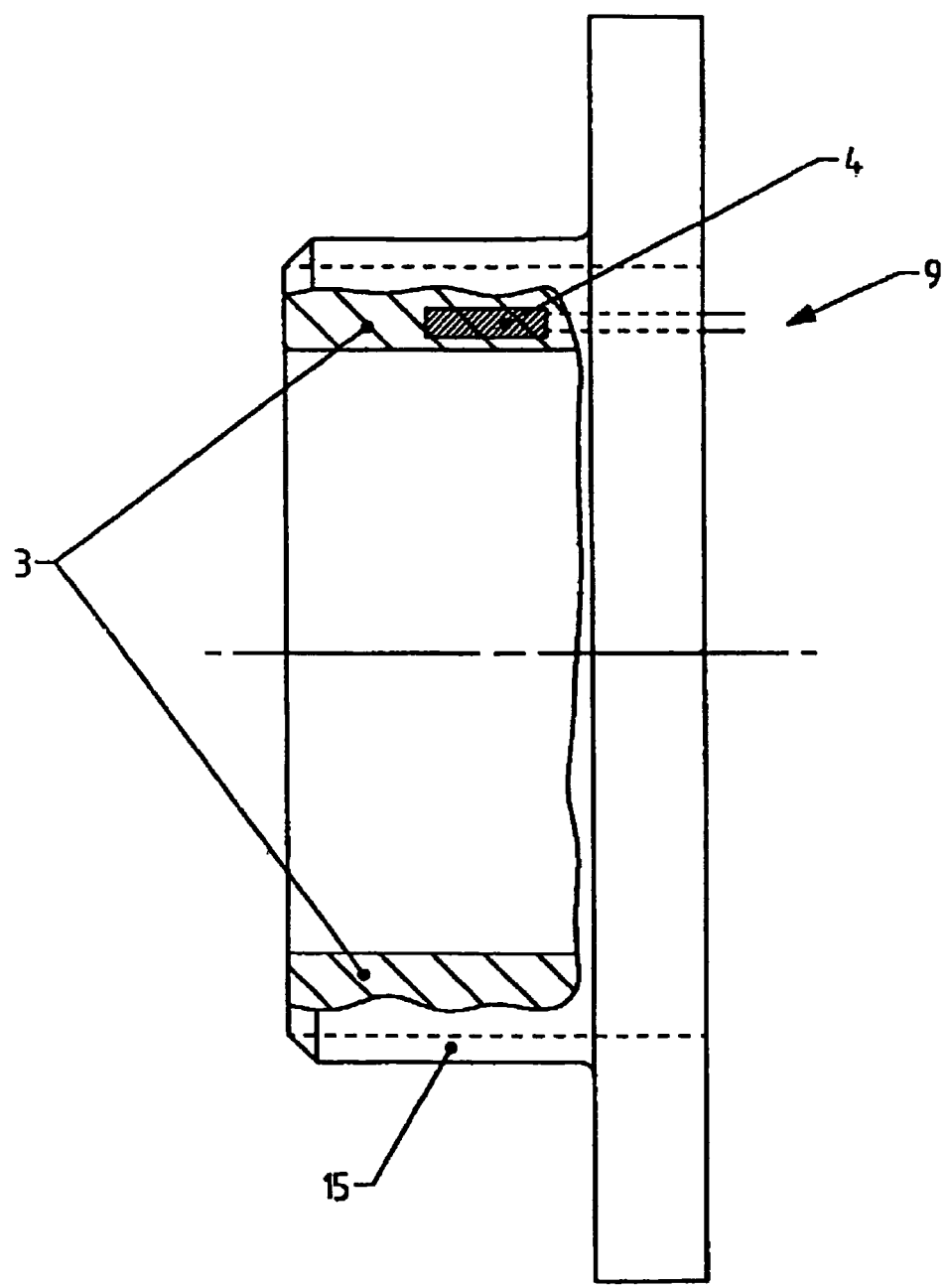
FIG. 6 represents a longitudinal section through a further annular sensor housing.

FIG. 6 shows a further embodiment of the annular sensor housing according to the present invention in a longitudinal cross-section. Shaft 1 is passed through a central bore of annular sensor housing 3 to the outside. Sensor housing 3 has an external thread 15 and is screwed into an internal thread of a bore. Sensor housing 3 is designed such that shaft 1 is guided directly through the central bore to the outside. Located near the inner surface of sensor housing 3 is at least one sensor 4 which is connected to an evaluation unit. The signals picked up by sensor 4 are carried away via cables 9 which lead axially away. In the present embodiment, shaft 1 itself is provided with devices, for example, with optical marking strips, which allow sensor 4 to generate a measured quantity. It is also possible for shaft 1 to be surrounded by an elastomer band, the band being alternately magnetized into north poles and south poles. Sensor housing 3 is centered in bore 2 for shaft 1. Sensor 4 can be embedded in sensor housing 3 or otherwise secured.

Figure 7:
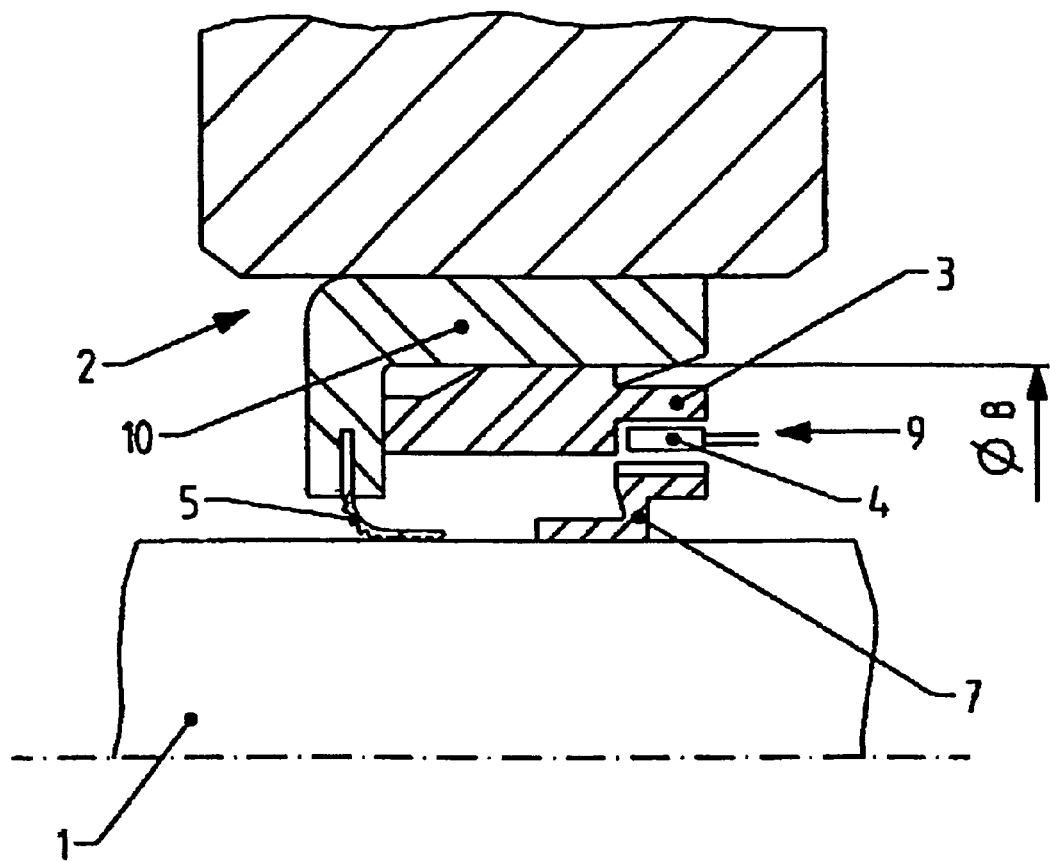
FIG. 7 is a longitudinal section through a further annular sensor housing.

FIG. 7 shows a further embodiment of the annular sensor housing according to the present invention in a longitudinal cross-section. An encoder wheel 7 is nonrotatably connected to shaft 1. Shaft 1 is passed through a central bore of annular sensor housing 3 to the outside. Adhesion part 10 for shaft sealing ring 5 is connected (clipped) to sensor housing 3 in a positive-locking manner and is preferably composed of plastic. Sensor housing 3 has an axial stop and is designed such that a narrow gap is formed between encoder wheel 7 and sensor housing 3. Located in sensor housing 3 is at least one sensor 4 which is connected to an evaluation unit. The signals picked up by sensor 4 are carried away via cables 9 which lead axially away. Adhesion part 10 is secured to the machine together with sensor housing 3. Bore 2 is the opening for the passage of shaft 1 from inside to outside of the machine. In the embodiment shown, sensor housing 3 has a centering diameter 8 which is greater than the diameter of encoder wheel 7. Sensor housing 3 is centered in adhesion part 10 in the bore for shaft 1. Sensor 4 can be embedded in sensor housing 3 or held by other fastening means.

Figure 8:
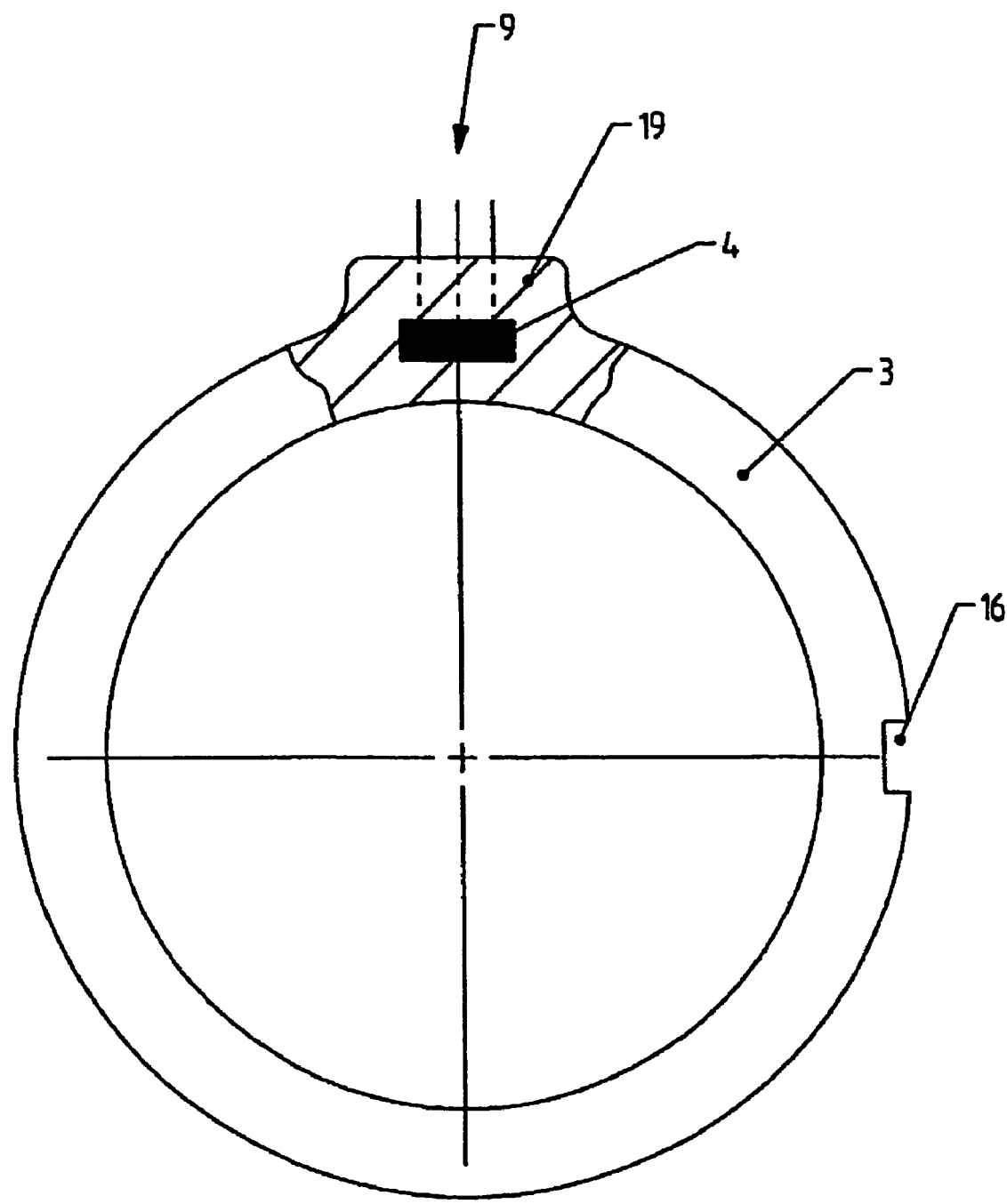
FIG. 8 is a view of an annular sensor housing.

FIG. 8 is a view of the annular sensor housing according to the present invention. Sensor housing 3 contains at least one sensor 4 near its inner diameter, the at lest one sensor 4 being connected to an evaluation unit. Sensor 4 and exit of cable 9 are arranged in a radial projection 19 facing outward. Moreover, sensor housing 3 has a groove 16 for a feather key for designating or fixing the angular position of the sensor housing 3. The mode of operation of the sensor system corresponds to the previously described embodiments.

Figure 9:
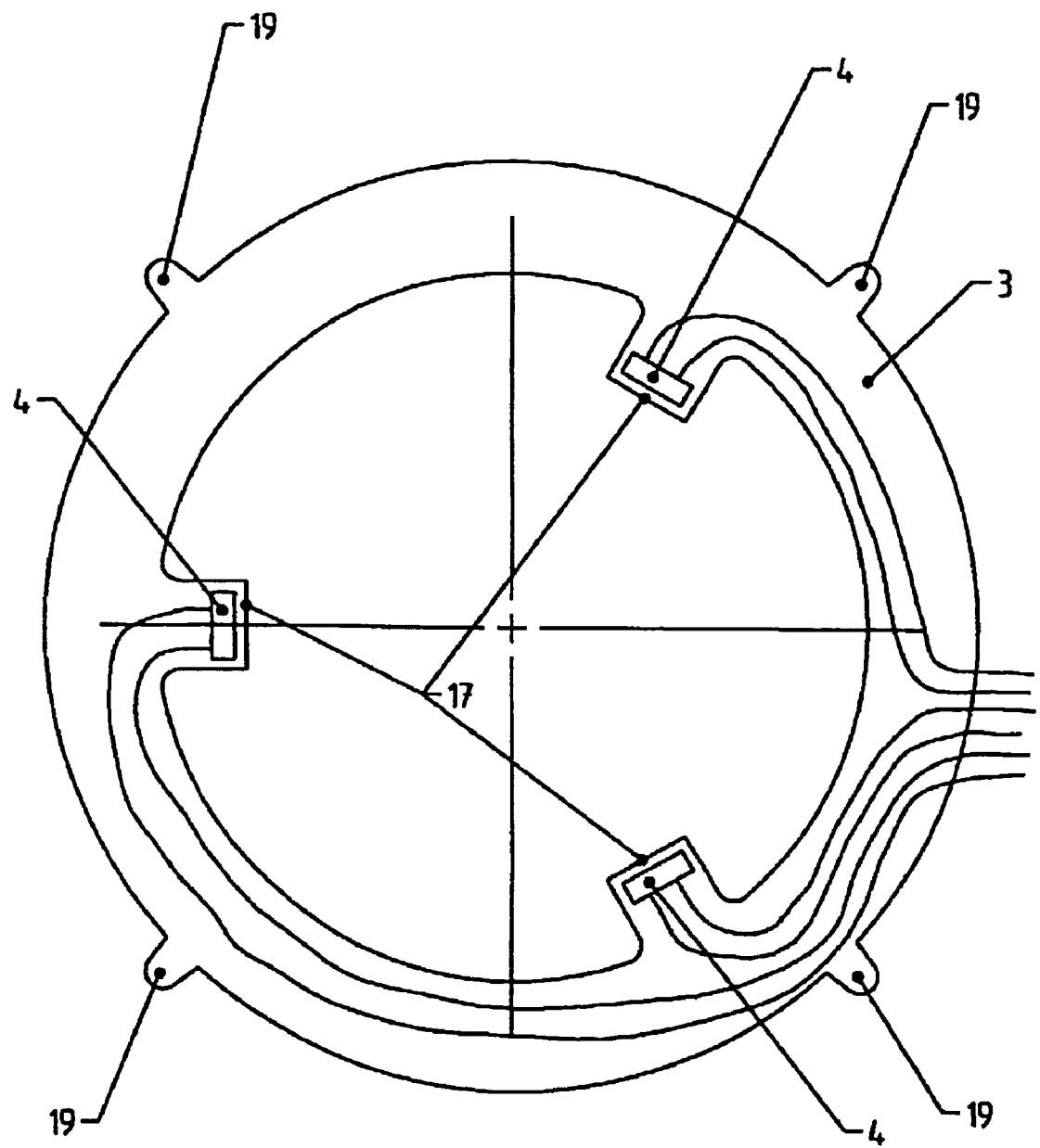
FIG. 9 depicts a view of a further annular sensor housing.

FIG. 9 is a view of a further annular sensor housing according to the present invention. Besides sensor housing 3, the FIG. shows three sensors 4 which are each arranged at an inward-facing radial projection 17 of sensor housing 3. At least one outward-facing radial projection 19 determines or sets the angular position of the sensor housing 3 in that radial projection 19 engages with a groove angularly adjustable with respect the machine housing. The exit of cables 9 is radial and is not located at the same point of the circumference where sensors 4 are mounted. The embodiment shown is particularly preferred because the arrangement of sensors 4 allows material savings.

Figure 10:
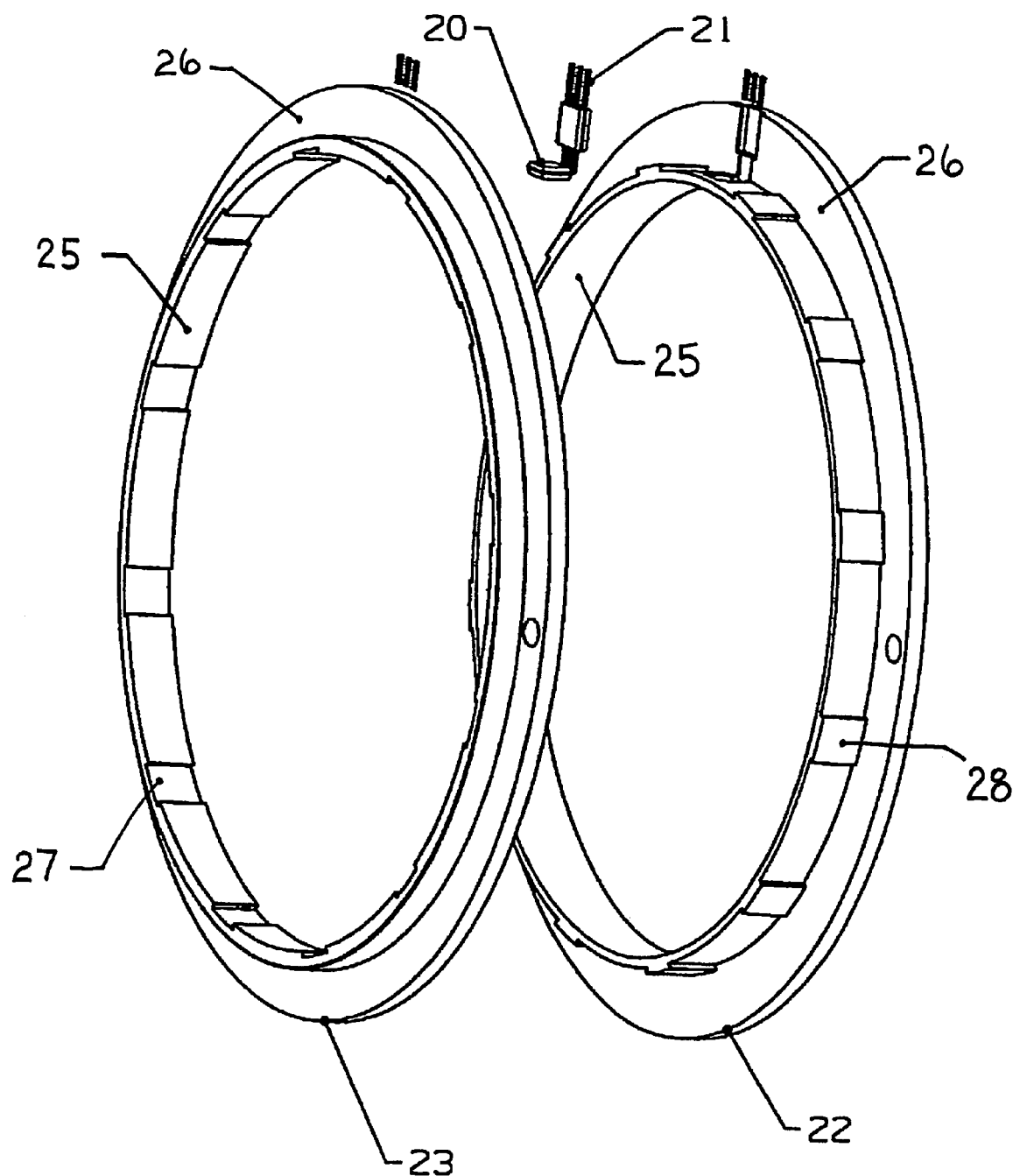
FIG. 10a/b is a view of and a longitudinal section through a further annular sensor housing.
Figure 10:
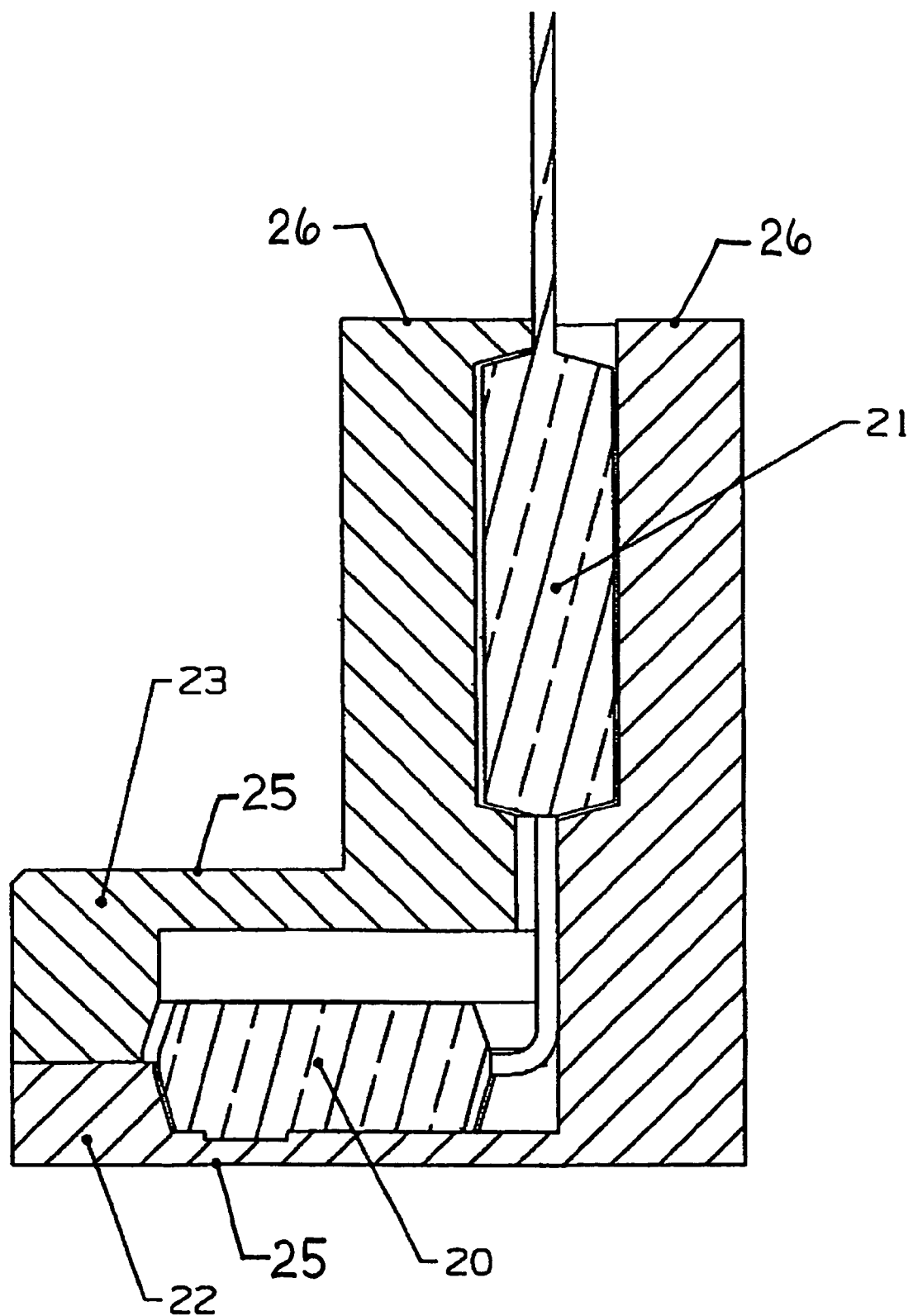

FIGS. 10a and 10b depict a view of and a section through an annular sensor housing according to the present invention. The sensor housing is composed of an outer ring 23 and an inner ring 22. Inner ring 22 and outer ring 23 each include an axial portion 25 and a radial portion 26. Sensor 4, which is composed of a measuring pickup 20 and a measuring transducer 21, is inserted between the two rings 22 and 23. Via cable 9, the measured quantities are passed on in a radial direction to an evaluation unit. The special feature of this embodiment is that measuring pickup 20 and measuring transducer 21 are inserted in the two separately produced rings 22 and 23. Preferably, measuring pickup 20 is disposed between the axial portions 25 of the inner and outer rings 22 and 23, respectively; and measuring tranducer 21 is disposed between the radial portions 26 of the inner and outer rings 22 and 23, respectively. In the delivery condition, the two rings 22 and 23 can be connected to each other in such a way that they cannot be lost. In this regard, it should be noted that the inner surface of outer ring 23 includes recesses 27 that are engageable with radially outwardly projecting tabs 28 formed on the inner ring 22. The shaft passes through the central bore of inner ring 22 to the outside. In the present embodiment, shaft 1 itself is provided with devices, for example, with optical marking strips, which allow sensor 4 to generate a measured quantity. Sensor housing 3 is centered in the bore for the shaft.

Figure 11:
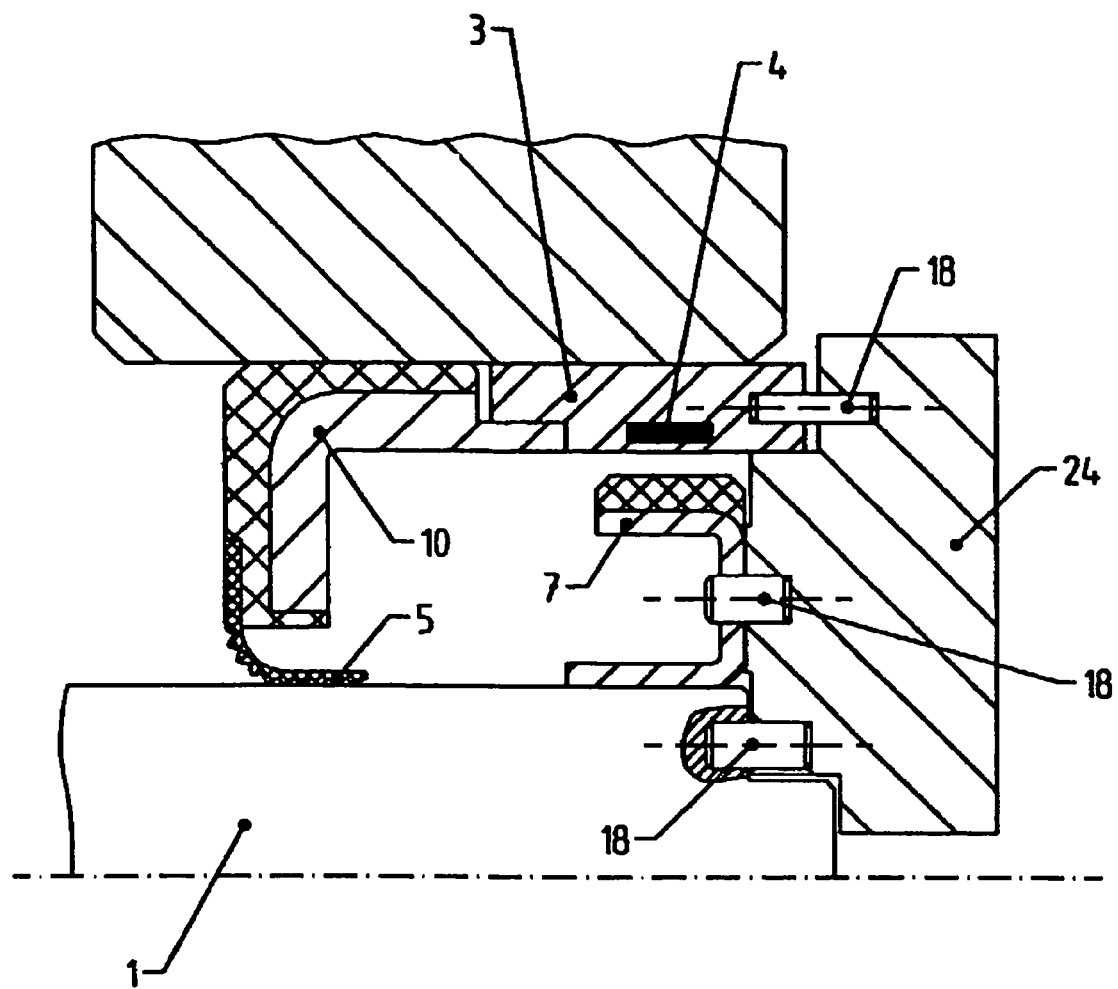
FIG. 11 is a longitudinal section through an annular sensor housing in the installed position.

FIG. 11 shows a further embodiment of the annular sensor housing according to the present invention in a longitudinal cross-section. There are shown sensor housing 3, encoder wheel 7 and mounting tool 24. For angular positioning, sensor housing 3 and encoder wheel 7 each have a hole with which engages a parallel pin 18 of the mounting tool. A further parallel pin 18 engages with shaft 1 to be sealed. Sensor housing 3 and encoder wheel 7 are adjusted with respect to the angular position using the same marking, for example, a bore, of shaft 1. This makes it possible to achieve a very accurate positioning and thus a good signal quality. In the embodiment shown, shaft sealing ring 5, sensor housing 3 including adhesion part 10 for shaft sealing ring 5, and encoder wheel 7 are mounted simultaneously. The special feature of this embodiment is that the positioning of the angle of the housing is carried out via mounting tool 24 and the bore in the shaft using parallel pin 18.

"Encoder" as defined herein is any mechanism permitting a sensor to read the angular position or rotary motion of a shaft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A sensor device for a shaft comprising:
a first annular ring;
a second annular ring engaged with said first annular ring; and
at least one sensor disposed between said first annular ring and said second annular ring,
wherein said first and second annular rings each include an axial portion and a radial portion,
said sensor includes a measuring pickup and a measuring transducer; and
said measuring pickup is disposed between axial portions of said first and second annular rings, and said measuring transducer is disposed between said radial portions of said first and second annular rings.

2. The sensor device according to claim 1, wherein said first annular ring includes a plurality of recesses, and said second annular ring includes a plurality of tabs, said tabs being engageable with said recesses.

3. The sensor device according to claim 1, wherein said sensor includes a cable that exits said first and second annular rings radially.

4. The sensor device according to claim 1, further comprising an encoder wheel non-rotatably mounted on the shaft.

5. The sensor device according to claim 4, wherein a gap is present between said sensor and said encoder wheel.

6. A sensor device for a shaft comprising:
a first annular ring;
a second annular ring engaged with said first annular ring; and
at least one sensor disposed between said first annular ring and said second annular ring,
wherein said first and second annular rings each include an axial leg and a radial leg, said radial legs extending radially relative to said axial legs,
said sensor includes a measuring pickup and a measuring transducer; and
said measuring pickup is disposed between axial legs of said first and second annular rings, and said measuring transducer is disposed between said radial legs of said first and second annular rings.

7. The sensor device according to claim 6, wherein said first annular ring includes a plurality of recesses, and said second annular ring includes a plurality of tabs, said tabs being engageable with said recesses.

8. The sensor device according to claim 6, wherein said sensor includes a cable that exits said first and second annular rings radially.

9. The sensor device according to claim 6, further comprising an encoder wheel non-rotatably mounted on the shaft.

10. The sensor device according to claim 9, wherein a gap is present between said sensor and said encoder wheel.

* * * * *